US012639127B2

(12) United States Patent
Howe et al.

(10) Patent No.: US 12,639,127 B2
(45) Date of Patent: May 26, 2026

(54) INTELLIGENT CONTENT DELIVERY NETWORK (CDN) ENTITY ROUTING

(71) Applicant: Disney Enterprises, Inc., Burbank, CA (US)

(72) Inventors: Thomas Howe, Chicago, IL (US); Mark Kegel, Dallas, TX (US); Edward Russell, West Caldwell, NJ (US); Joseph Higgins, New York, NY (US); Daniel Spiewak, Boulder, CO (US); Matthias Sainz, Monument, CO (US)

(73) Assignee: Disney Enterprises, Inc., Burbank, CA (US)

( * ) Notice: Subject to any disclaimer, the term of this patent is extended or adjusted under 35 U.S.C. 154(b) by 706 days.

(21) Appl. No.: 17/809,246

(22) Filed: Jun. 27, 2022

(65) Prior Publication Data

US 2023/0418675 A1 Dec. 28, 2023

(51) Int. Cl.
*G06F 9/50* (2006.01)
(52) U.S. Cl.
CPC .................................... *G06F 9/505* (2013.01)
(58) Field of Classification Search
CPC . G06F 9/505; H04L 43/0876; H04L 43/0888; H04L 67/1097
USPC ....................................................... 718/104
See application file for complete search history.

(56) References Cited

U.S. PATENT DOCUMENTS 5,646,676 A  7/1997  Dewkett et al.
5,684,963 A  11/1997  Clement
6,205,477 B1  3/2001  Johnson et al.
6,591,383 B1  7/2003  Michel et al.
6,947,445 B1 *  9/2005  Barnhart ............... H04L 47/781
                                                  370/468
7,260,598 B1 *  8/2007  Liskov ................... H04L 67/63
                                                  709/201

(Continued)

FOREIGN PATENT DOCUMENTS

CN       103546477 A    1/2014
CN       103368940 B    4/2017
(Continued)

OTHER PUBLICATIONS

U.S. Appl. No. 17/937,965, filed Oct. 4, 2022, Qiang She.
(Continued)

*Primary Examiner* — Adam Lee
(74) *Attorney, Agent, or Firm* — Kwan & Olynick LLP

(57) ABSTRACT

In some embodiments, a method receives usage data that is based on a delivery of content by a plurality of content delivery network entities. A first value of a selection parameter is used to determine whether to select a content delivery network entity from the plurality of content delivery network entities to process a first request for content. The method allocates the usage data in a first distribution to the plurality of content delivery network entities. The allocating does not use a condition to determine the first distribution. The usage data is allocated in a second distribution to the plurality of content delivery network entities. The allocating uses the condition to determine the second distribution. The method adjusts the first value of the selection parameter to a second value based on the first distribution and the second distribution.

20 Claims, 9 Drawing Sheets

(56)        References Cited

U.S. PATENT DOCUMENTS

| | | | |
|---|---|---|---|
| 7,565,413 B1* | 7/2009 | O'Toole, Jr. ............ H04L 67/06 | |
| | | | 709/219 |
| 7,742,485 B2 | 6/2010 | Zhang | |
| 7,756,913 B1* | 7/2010 | Day ..................... H04L 67/306 | |
| | | | 709/225 |
| 7,895,445 B1 | 2/2011 | Albanese et al. | |
| 8,117,306 B1 | 2/2012 | Baumback et al. | |
| 8,169,916 B1 | 5/2012 | Pai et al. | |
| 8,276,180 B1 | 9/2012 | Slavenburg et al. | |
| 8,370,208 B1 | 2/2013 | Gupta et al. | |
| 8,438,393 B2 | 5/2013 | Zhang | |
| 8,495,675 B1* | 7/2013 | Philpott ........... H04N 21/26258 | |
| | | | 725/62 |
| 8,707,375 B2 | 4/2014 | Hainline | |
| 8,843,972 B2 | 9/2014 | Calisa et al. | |
| 9,078,020 B2 | 7/2015 | Buehl et al. | |
| 9,137,302 B1* | 9/2015 | Makhijani .......... H04L 67/1001 | |
| 9,204,103 B1 | 12/2015 | Zhang et al. | |
| 9,246,965 B1* | 1/2016 | Stoica ..................... H04L 67/01 | |
| 9,712,850 B2 | 7/2017 | Buehl et al. | |
| 9,967,734 B1* | 5/2018 | Bertz ................. H04W 28/085 | |
| 9,986,049 B2 | 5/2018 | Zhao et al. | |
| 10,182,096 B1* | 1/2019 | Siddiqi ................. H04L 67/563 | |
| 10,194,210 B2 | 1/2019 | Coudurier et al. | |
| 10,862,994 B1* | 12/2020 | Ganjam .................. H04L 67/60 | |
| 11,082,741 B2 | 8/2021 | Xie et al. | |
| 11,496,786 B2 | 11/2022 | She et al. | |
| 11,889,140 B2 | 1/2024 | She et al. | |
| 2002/0059573 A1 | 5/2002 | Nishio et al. | |
| 2002/0126135 A1* | 9/2002 | Ball ......................... G06F 3/14 | |
| | | | 345/600 |
| 2004/0226045 A1 | 11/2004 | Nadarajah | |
| 2005/0033858 A1 | 2/2005 | Swildens et al. | |
| 2006/0168632 A1 | 7/2006 | Honda et al. | |
| 2008/0215718 A1 | 9/2008 | Stolorz et al. | |
| 2008/0306999 A1 | 12/2008 | Finger et al. | |
| 2009/0125393 A1 | 5/2009 | Hwang et al. | |
| 2009/0168752 A1 | 7/2009 | Segel | |
| 2009/0259611 A1 | 10/2009 | Wang et al. | |
| 2010/0036954 A1 | 2/2010 | Sakata et al. | |
| 2010/0070603 A1 | 3/2010 | Moss et al. | |
| 2010/0202509 A1 | 8/2010 | Thompson et al. | |
| 2010/0228819 A1 | 9/2010 | Wei | |
| 2011/0019627 A1 | 1/2011 | Krishnaswamy et al. | |
| 2011/0078327 A1* | 3/2011 | Li ....................... H04L 61/4511 | |
| | | | 709/245 |
| 2011/0137973 A1* | 6/2011 | Wei ..................... H04L 67/1001 | |
| | | | 709/202 |
| 2011/0145317 A1* | 6/2011 | Serban ................. H04L 67/563 | |
| | | | 709/238 |
| 2011/0196894 A1 | 8/2011 | Farber et al. | |
| 2011/0296053 A1* | 12/2011 | Medved ................ H04L 67/104 | |
| | | | 709/241 |
| 2012/0079524 A1 | 3/2012 | Kalidindi et al. | |
| 2012/0089843 A1 | 4/2012 | Kato et al. | |
| 2012/0120314 A1* | 5/2012 | Yang .................... H04N 17/004 | |
| | | | 348/E9.034 |
| 2012/0240176 A1* | 9/2012 | Ma ..................... H04N 21/2181 | |
| | | | 725/114 |
| 2012/0297410 A1 | 11/2012 | Lohmar et al. | |
| 2013/0013377 A1 | 1/2013 | Kruglick | |
| 2013/0013688 A1 | 1/2013 | Wang et al. | |
| 2013/0013764 A1* | 1/2013 | Li .................... H04N 21/64723 | |
| | | | 709/224 |
| 2013/0097277 A1* | 4/2013 | Kim ........................ H04L 47/00 | |
| | | | 709/217 |
| 2013/0117120 A1* | 5/2013 | Shafiee ........... H04N 21/25891 | |
| | | | 705/14.66 |
| 2013/0268577 A1 | 10/2013 | Oyman | |
| 2014/0089465 A1* | 3/2014 | van Brandenburg ... H04L 67/52 | |
| | | | 709/217 |
| 2014/0089990 A1* | 3/2014 | van Deventer ........... H04L 9/40 | |
| | | | 725/115 |
| 2014/0089998 A1 | 3/2014 | Buehl et al. | |
| 2014/0095707 A1* | 4/2014 | He ...................... H04L 67/1029 | |
| | | | 709/224 |
| 2014/0108671 A1* | 4/2014 | Watson ................. H04L 65/612 | |
| | | | 709/231 |
| 2014/0149794 A1 | 5/2014 | Shetty et al. | |
| 2014/0164584 A1 | 6/2014 | Joe et al. | |
| 2014/0181285 A1 | 6/2014 | Stevens et al. | |
| 2014/0215051 A1* | 7/2014 | Schlack ............... H04L 67/289 | |
| | | | 709/224 |
| 2014/0233740 A1* | 8/2014 | Niamut ................. H04L 9/3013 | |
| | | | 380/279 |
| 2014/0344908 A1* | 11/2014 | Rizzo .................. H04L 63/0869 | |
| | | | 709/219 |
| 2014/0365613 A1 | 12/2014 | Phillips et al. | |
| 2014/0379871 A1* | 12/2014 | Van Brandenburg ... H04L 65/65 | |
| | | | 709/219 |
| 2015/0012593 A1 | 1/2015 | Phillips et al. | |
| 2015/0127765 A1* | 5/2015 | Bergman ............ H04L 61/4511 | |
| | | | 709/213 |
| 2015/0189011 A1* | 7/2015 | Hunt ..................... H04L 67/108 | |
| | | | 709/219 |
| 2015/0256577 A1* | 9/2015 | Gutierrez Vilaro ... H04L 67/101 | |
| | | | 709/203 |
| 2015/0264413 A1 | 9/2015 | Buehl et al. | |
| 2015/0382057 A1 | 12/2015 | Huang et al. | |
| 2016/0234069 A1 | 8/2016 | Coudurier et al. | |
| 2016/0337426 A1 | 11/2016 | Shribman et al. | |
| 2017/0012878 A1* | 1/2017 | Rahman ............. H04L 67/1014 | |
| 2017/0118533 A1* | 4/2017 | Holtz ................. G06Q 30/0241 | |
| 2017/0126616 A1* | 5/2017 | Halley ............... H04L 61/4511 | |
| 2017/0134253 A1* | 5/2017 | Wang ..................... H04L 67/10 | |
| 2017/0180470 A1* | 6/2017 | Zhang ................ H04L 67/1074 | |
| 2017/0188059 A1 | 6/2017 | Major | |
| 2017/0188072 A1* | 6/2017 | Major ................ H04N 21/2187 | |
| 2017/0257287 A1 | 9/2017 | Kim et al. | |
| 2017/0272485 A1* | 9/2017 | Gordon ................... H04L 65/75 | |
| 2018/0084306 A1 | 3/2018 | Hunter | |
| 2018/0167486 A1 | 6/2018 | Pacella et al. | |
| 2018/0198694 A1* | 7/2018 | Wells ..................... H04L 43/08 | |
| 2018/0219932 A1 | 8/2018 | Natarajan et al. | |
| 2018/0241796 A1 | 8/2018 | Srinivasan et al. | |
| 2018/0278708 A1* | 9/2018 | Ishihara .................. H04L 67/60 | |
| 2018/0373580 A1 | 12/2018 | Ertl et al. | |
| 2018/0376197 A1 | 12/2018 | Gonzalez | |
| 2020/0228618 A1* | 7/2020 | Wu ......................... H04L 67/63 | |
| 2020/0280606 A1* | 9/2020 | Choi ..................... G06F 9/4881 | |
| 2021/0117322 A1* | 4/2021 | Baughman .............. H04L 67/61 | |
| 2021/0120078 A1* | 4/2021 | Wang ................... H04L 67/108 | |
| 2021/0152882 A1* | 5/2021 | Xie .................... H04N 21/2225 | |
| 2022/0103615 A1* | 3/2022 | Casey ..................... H04L 67/10 | |
| 2022/0182685 A1 | 6/2022 | Dai et al. | |
| 2022/0217432 A1* | 7/2022 | She ......................... H04L 65/80 | |
| 2022/0303331 A1 | 9/2022 | Svennebring et al. | |
| 2022/0337643 A1* | 10/2022 | Yousef ............. H04N 21/23439 | |
| 2023/0041976 A1 | 2/2023 | She | |
| 2023/0188810 A1* | 6/2023 | Beheydt ........... H04N 21/44209 | |
| | | | 709/231 |
| 2023/0308733 A1* | 9/2023 | Gangakhedkar ... H04N 21/2393 | |
| 2024/0031420 A1 | 1/2024 | Dai et al. | |
| 2024/0205473 A1 | 6/2024 | Tian et al. | |

FOREIGN PATENT DOCUMENTS

| | | |
|---|---|---|
| CN | 103825837 B | 6/2017 |
| CN | 107251569 A | 10/2017 |
| CN | 107251569 B | 3/2020 |
| EP | 3257233 A1 | 12/2017 |
| EP | 3257233 A4 | 8/2018 |
| EP | 3742706 A1 | 11/2020 |
| EP | 4027616 A1 | 7/2022 |
| JP | 2012080394 A | 4/2012 |
| JP | 2020127130 A | 8/2020 |
| KR | 20100054661 A | 5/2010 |
| KR | 20220059425 A | 5/2022 |
| WO | 2014062581 A2 | 4/2014 |
| WO | 2022034619 A1 | 2/2022 |

(56)         References Cited

FOREIGN PATENT DOCUMENTS

| WO | 2022107669 A1 | 5/2022 |
| WO | 2022204114 A1 | 9/2022 |

OTHER PUBLICATIONS

Dai et al., "Content Delivery Network (CDN) Selection Using Performance Metric," filed Aug. 24, 2022, U.S. Appl. No. 17/822,053, 45 pages.
Gangakhedkar et al., "System and Method for Delivering Media Content to Users," filed Feb. 13, 2023, U.S. Appl. No. 18/041,535, 54 pages.
Howe et al., "Intelligent Content Delivery Network (CDN) Entity Routing," filed Jun. 27, 2022, U.S. Appl. No. 17/809,246, 42 pages.
International Search Report & Written Opinion dated Nov. 26, 2021, serial No. PCT/IN21/50781, 9 pages.
Chinese Application Serial No. 201680009559.8, Office Action dated Jun. 26, 2019, 21 pgs.
European Application No. 22150150.5, Search Report mailed May 27, 2022, 9 pgs.
European Application Serial No. 16749817.9, Office Action dated May 6, 2019, 9 pgs.
Extended European Search Report & Opinion for EP Application 16749817.9 {118-8502EP) dated Jul. 20, 2018, 9 pages.
International Search Report & Written Opinion for PCT Application PCT/US2016/017380 {118-8501WO) mailed Jun. 8, 2016, 16 pages.
PID Controller, Wikipedia, Retrieved from the Internet on Jun. 27, 2022: https://en.wikipedia.org/wiki/PID_controller.
European Extended Search Report, Application No. 23204937.9, Dated Jan. 25, 2024, 11 pages.
European Office Action, dated Jun. 13, 2023, Application No. 22150150.5, 2 pages.
European Search Report, Application No. 23184904.3, dated Oct. 25, 2023, 10 pages.
Office Action for Japanese Application No. 2023-067009, dated Jun. 4, 2024, 3 pgs.
Foreign Office Action, JP Patent Application No. 2023-173635, mailed Dec. 3, 2024.
Office Action for Japanese Application No. 2023-067009, dated Sep. 10, 2024, 3 pgs.
U.S. Appl. No. 17/142,982, filed Jan. 6, 2021, She.
U.S. Appl. No. 17/809,246, filed Jun. 27, 2022, Thomas Howe.
U.S. Appl. No. 17/822,053, filed Aug. 24, 2022, Tongyu Dai.
Examination Report pursuant to Article 94(3) EPC, European Patent Application 23 184 904.3, mailed Jun. 26, 2025, 6 pages.
Examination Report pursuant to Article 94(3) EPC, European Patent Application 23 204 937.9, mailed Jun. 12, 2025, 4 pages.
Decision of Rejection, JP Patent Application No. 2023-173635, mailed Apr. 22, 2025, 6 pages.
Examination Report pursuant to Article 94(3) EPC, European Patent Application 23 204 937.9, mailed Nov. 28, 2025, 6 pages.

* cited by examiner

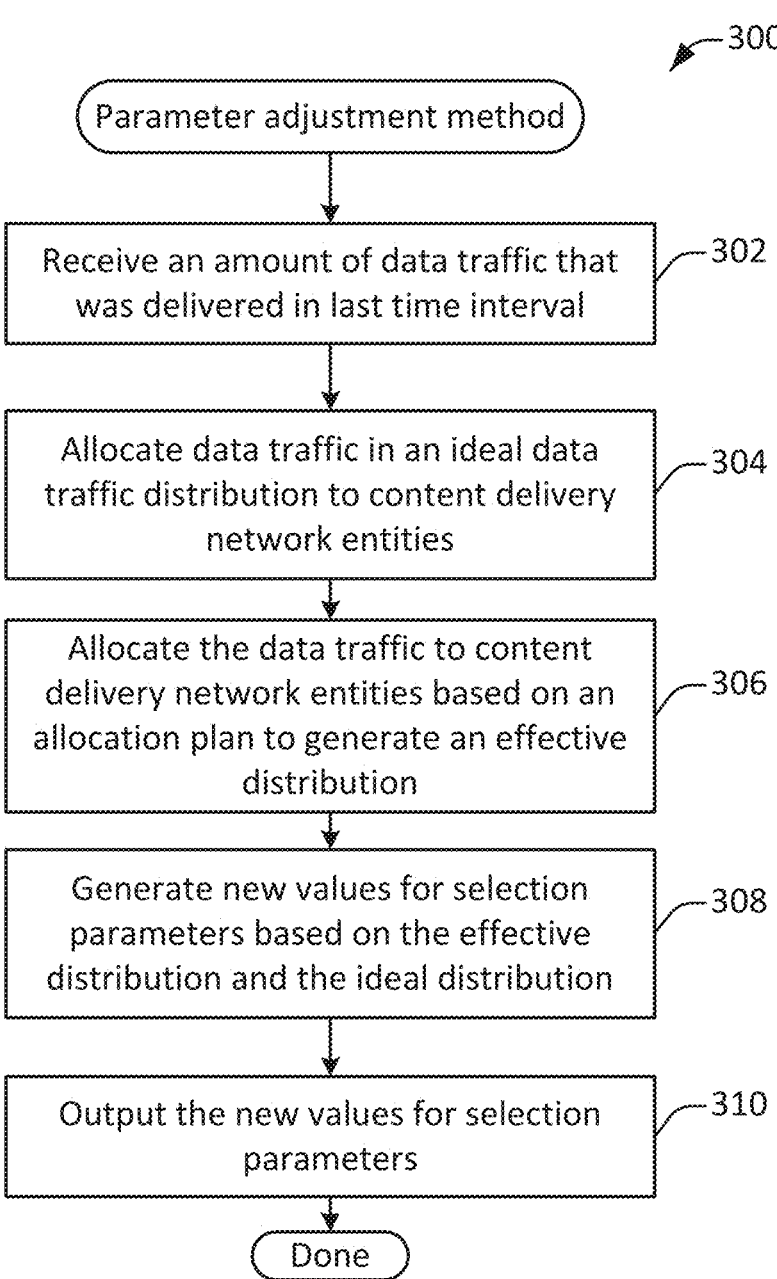

300

Parameter adjustment method

Receive an amount of data traffic that was delivered in last time interval — 302

Allocate data traffic in an ideal data traffic distribution to content delivery network entities — 304

Allocate the data traffic to content delivery network entities based on an allocation plan to generate an effective distribution — 306

Generate new values for selection parameters based on the effective distribution and the ideal distribution — 308

Output the new values for selection parameters — 310

Done

| CDN entity | Minimum (Gbps) | Maximum (Gbps) | Initial Weight | Normalized Initial Weight |
|---|---|---|---|---|
| Entity #1 | 2 | 1000 | 4 | 0.2 |
| Entity #2 | 4 | 500 | 6 | 0.3 |
| Entity #3 | 2 | 15000 | 3 | 0.15 |
| Entity #4 | 200 | 300 | 2 | 0.1 |
| Entity #5 | 50 | 7000 | 5 | 0.25 |

600-2

| Time Interval | Traffic (Gbps) |
|---|---|
| Interval #1 | 1000 |
| Interval #2 | 1100 |
| Interval #3 | 500 |
| Interval #4 | 400 |

600-3 ➤

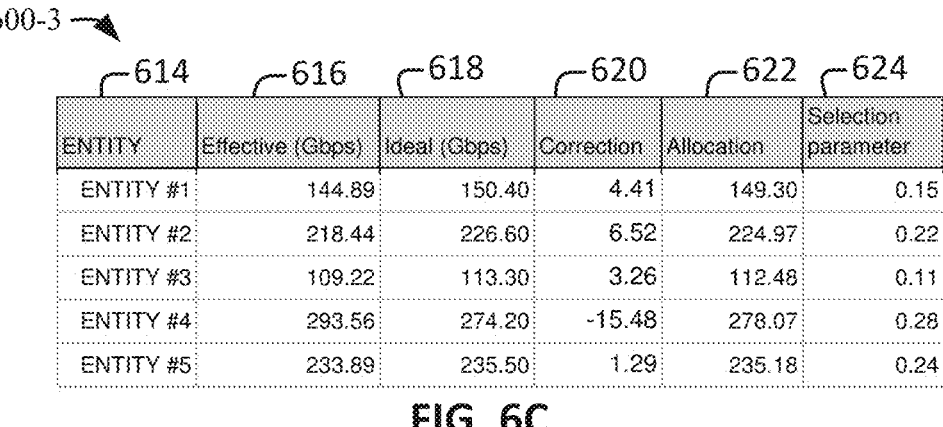

| ENTITY | Effective (Gbps) | Ideal (Gbps) | Correction | Allocation | Selection parameter |
|---|---|---|---|---|---|
| ENTITY #1 | 144.89 | 150.40 | 4.41 | 149.30 | 0.15 |
| ENTITY #2 | 218.44 | 226.60 | 6.52 | 224.97 | 0.22 |
| ENTITY #3 | 109.22 | 113.30 | 3.26 | 112.48 | 0.11 |
| ENTITY #4 | 293.56 | 274.20 | -15.48 | 278.07 | 0.28 |
| ENTITY #5 | 233.89 | 235.50 | 1.29 | 235.18 | 0.24 |

| ENTITY | Effective (Gbps) | Ideal (Gbps) | Correction | Allocation | Selection parameter |
|---|---|---|---|---|---|
| ENTITY #1 | 164.23 | 170.40 | 3.84 | 168.06 | 0.15 |
| ENTITY #2 | 247.47 | 256.60 | 5.68 | 253.14 | 0.23 |
| ENTITY #3 | 123.73 | 128.30 | 2.84 | 126.57 | 0.12 |
| ENTITY #4 | 305.88 | 284.20 | -13.47 | 292.41 | 0.27 |
| ENTITY #5 | 258.70 | 260.50 | 1.12 | 259.82 | 0.24 |

| ENTITY | Effective (Gbps) | Ideal (Gbps) | Correction | Allocation | Selection parameter |
|---|---|---|---|---|---|
| ENTITY #1 | 76.39 | 50.40 | -21.75 | 54.64 | 0.11 |
| ENTITY #2 | 115.06 | 76.60 | -32.19 | 82.87 | 0.17 |
| ENTITY #3 | 57.53 | 38.30 | -16.10 | 41.44 | 0.08 |
| ENTITY #4 | 132.91 | 224.20 | 76.40 | 209.31 | 0.42 |
| ENTITY #5 | 118.10 | 110.50 | -6.36 | 111.74 | 0.22 |

| ENTITY | Effective (Gbps) | Ideal (Gbps) | Correction | Allocation | Selection parameter |
|---|---|---|---|---|---|
| ENTITY #1 | 43.71 | 30.40 | -4.87 | 38.84 | 0.10 |
| ENTITY #2 | 66.30 | 46.60 | -7.20 | 59.10 | 0.15 |
| ENTITY #3 | 33.15 | 23.30 | -3.60 | 29.55 | 0.07 |
| ENTITY #4 | 167.45 | 214.20 | 17.09 | 184.54 | 0.46 |
| ENTITY #5 | 89.39 | 85.50 | -1.42 | 87.97 | 0.22 |

FIG. 6F

INTELLIGENT CONTENT DELIVERY NETWORK (CDN) ENTITY ROUTING

BACKGROUND

A content provider may use multiple content delivery network entities to deliver content to client devices. For example, content delivery network entities may deliver videos for a video service provider. A content delivery network entity may be a cluster of servers that can deliver content for the provider. When a client device requests a video, a service of the provider may select one of the content delivery network entities to process the request. Upon receiving a selection of a content delivery network entity, the client device communicates with that content delivery network entity to have the video delivered from that content delivery network entity. Each content delivery network entity may have an associated policy that provides parameters that are used by the service to select a content delivery network entity for a request. The parameters are static unless they are changed manually. However, the conditions of how videos are delivered during different time periods may rapidly change, such as at the top of the hour when new shows become available on live television or when a show becomes popular. The use of static parameters may not optimally select content delivery network entities when the conditions change rapidly.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts a simplified flowchart of a method for adjusting selection parameters according to some embodiments.

FIGS. 6A to 6F depict different tables showing the analysis of data traffic to allocate the data traffic to content delivery network entities according to some embodiments.

DETAILED DESCRIPTION

Figure 1:
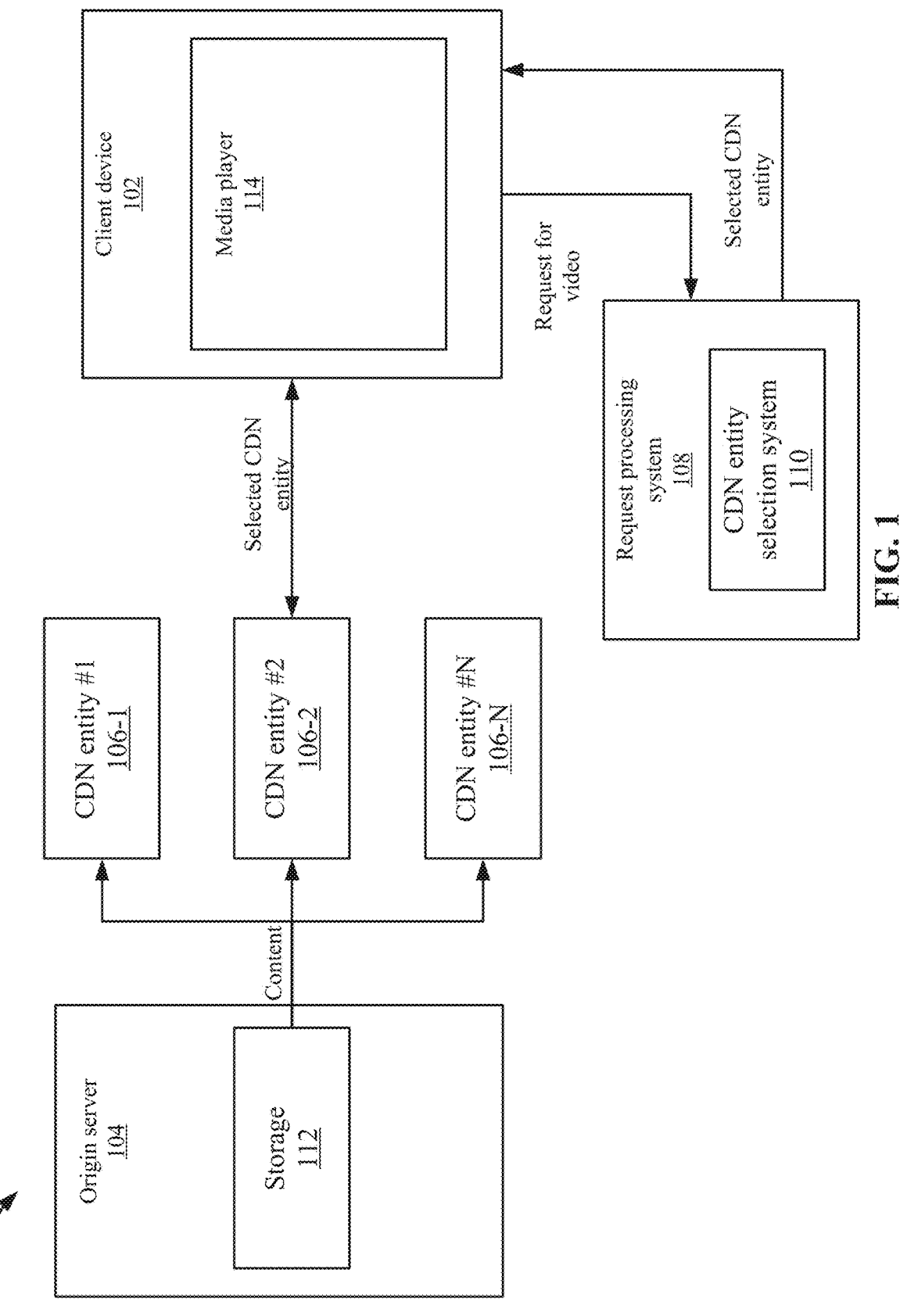
FIG. 1 depicts a simplified system for selecting a content delivery network entity according to some embodiments.

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system may process requests for content from client devices. For example, a client device may send a request for content. For example, the content may be a piece of video, audio, or other type of content that can be played on a media player or otherwise rendered via a computing device. The system may select from multiple content delivery network entities that can deliver the content to service the request. A content delivery network entity may be any entity that can be selected to service a request to deliver content to client devices. Content delivery network entities may include a content provider that may operate its own content delivery network, or other independent content delivery network entities that assist in the delivery of the content provider's content to end users. There may be many reasons to distribute traffic among the available content delivery networks according to a certain distribution scheme. The content provider's content delivery system may use a selection process to select a content delivery network entity to service a given request. The selection process may use selection parameters that affect which content delivery network entity is selected. For example, over multiple requests, the selection process may select content delivery network entities to roughly meet a distribution that is defined by the selection parameters. For example, the selection parameters may be normalized to a proportion P for a content delivery network entity such that over N requests, the content delivery network entity may roughly receive P*N requests.

Instead of using static parameters, the system may adjust the selection parameters based on usage data from the content delivery network entities. The usage data may be data traffic, which may be an amount of data that is delivered while sending content to client devices. The usage data may be determined for a time interval, such as the last minute, multiple minutes, hour, etc., from the content delivery network entities. The time interval may be configured using a setting, or dynamically determined. For example, the time interval may be set as every minute. Alternatively, the time interval may change when network conditions change. Then, the system may adjust the selection parameters based on the usage data. Accordingly, the system may automatically adjust the selection parameters that are used in the selection process in the next time interval. For example, a first content delivery network entity may have processed 10 gigabytes per second (Gbps) of traffic in the last time interval. If the system determines that the first content delivery network should process more data traffic, the system may adjust selection parameters to make it more likely the first content delivery network will process more data traffic. That is, the selection parameters are adjusted such that over the next N requests, the first content delivery network entity may receive more requests than the previous time interval. The calculation to dynamically adjust the selection parameters will be described in more detail below.

By dynamically and automatically adjusting the selection parameters for content delivery network entities, the selection of content delivery network entities to process requests may be adjusted as conditions change. For example, the system may automatically adjust the usage of a content delivery network entity to a desired usage as the usage changes dynamically over time intervals. The adjustment improves the selection of content delivery network entities for requests. The adjustment may optimally use the bandwidth of the content delivery network entities, which may improve network performance. Also, the delivery of content may be improved as problems when networks become congested due to less available bandwidth, such as rebuffering, may be avoided by adjusting the parameters based on the usage data.

System Overview

FIG. 1 depicts a simplified system 100 for selecting a content delivery network entity 106 according to some embodiments. System 100 includes a client device 102, an origin server 104, content delivery network entities (CDNs) #1 to #N 106-1 to 106-N, and a request processing system 108.

A content delivery network entity 106 may be any entity that can be selected to service a request to deliver content (e.g., videos) to client devices 102. Content delivery network entities 106 may be defined in different ways. The content delivery network entity may be defined by a configuration, which may specify servers within the content delivery network entity. The content delivery entity may define the specific servers. In some embodiments, each content delivery network entity 106 may be independent from each other. That is, a first content delivery network entity 106 is operated (e.g., owned) by a different company than a second content delivery network entity 106. In other embodiments, a single company may operate multiple content delivery network entities 106. In some embodiments, the operation or ownership of different content delivery network entities 106 may be defined by different methods, such as by configurations, policies, etc. For example, a first content delivery network entity 106 may have a first configuration that defines the delivery of content (e.g., cost, amount of data to transmit, etc.) to it and a second content delivery network entity 106 may have a second configuration that defines the delivery of content to it. When content delivery network entities 106 are associated with the same company, each content delivery network entity 106 may be considered separately when determining whether it should service a request. That is, each content delivery network entity 106 may have a separate configuration. Although the above configuration of entities is discussed, other configurations may also be appreciated, such as any cluster of servers may be a content delivery network entity 106.

A content delivery network entity 106 may be identified based on an identifier for each content delivery network entity, such as a host name. Within a content delivery network entity 106, there may be multiple content endpoints. Each content endpoint may be associated with the same host name. In some embodiments, when a content delivery network entity 106 is selected to service a request, the request may be serviced by any content endpoints that are associated with the hostname of that content delivery network entity 106. When selected to process a request, content delivery network entity 106 may select the content endpoint to service the request. In other examples, the system may select a specific content endpoint for a content delivery network entity 106 that should service the request. Also, in some embodiments, the same server that receives the request may process the delivery of the content to a client. In other embodiments, different servers may process the request and the delivery of the content to a client.

Origin server 104 may store representations of content in storage 112. The representations may include different playback characteristics for the content, such as different representations of a video at different bitrates or quality (e.g., resolutions). Origin server 104 may provide the representations of content to different content delivery network entities #1 to #N. Client device 102 can request the content from each content delivery network entity 106 and each content delivery network entity 106 may independently be able to respond with the content. For example, each content delivery network entity 106 may include one or more servers that can send the content to client device 102.

Client device 102 may include a computing device, such as a smartphone, set top box, tablet device, living room device, gaming console, etc. Client device 102 includes a media player 114 that can play the content. Client device 102 may use one of the content delivery network entities 106, such as a content delivery network entity #2, to begin playing the content with media player 114. Client device 102 may experience different playback conditions for each content delivery network entity 106. For example, the playback conditions may differ based on available bandwidth, the network being used by each content delivery network entity 106, and the servers being used. This results in the content being delivered using different conditions to client device 102.

A request processing system 108 may process a request for content (e.g., a video) from client device 102. Request processing system 108 may be associated with a content provider that is offering content to user accounts. Although not shown, request processing system 108 may be processing requests from multiple client devices 102, both sequentially and concurrently in a time period. For example, multiple client devices 102 may be using a video delivery system to request videos concurrently or within a time interval. The time interval may be a limited time period, such as a minute, every X minutes, an hour, a day, etc. The time interval may be defined in different ways, and may include a contiguous time block, but does not need to include contiguous time blocks. The time interval may also be adjusted, such as the amount of time in a time interval may vary over time. For example, the time interval may be every minute. Alternatively, a first time interval may be one minute, a second time interval is three minutes, a third time interval is X minutes, etc. Also, a beginning or end of a time interval may be triggered. For example, a failure of a content delivery network entity 106 may trigger the start or end of a new time interval, which may then start the process of determining new selection parameters.

Request processing system 108 is configured to receive a request for content. A content delivery network (CDN) entity selection system 110 may select the content delivery network entity 106 for the request. Request processing system 108 may provide the selected content delivery network entity 106 to client device 102 or the selected content delivery network entity 106. Client device 102 may then interact with the selected content delivery network entity 106, such as content delivery network entity #2 106-2. Content delivery network entity #2 106-2 may then send the video, such as segments of the video, to client device 102, which displays the segments of video on media player 114.

CDN entity selection system 110 may select a content delivery network entity 106 to process the request based on a selection process that uses selection parameters. As will be described in more detail below, CDN entity selection system 110 may use the usage data from content delivery network entities 106 to adjust the selection parameters that are used to select which content delivery network entity 106 should process the request. The usage data may be measured using different metrics, such as bytes of data, available bandwidth, computing resources used, and other metrics. For discussion purposes, the usage data may be an amount of data traffic based on content that is sent by content delivery network entities 106 for a provider, such as the provider of a video delivery system. CDN entity selection system 110 will now be described in further detail.

CDN Entity Selection System

Figure 2:
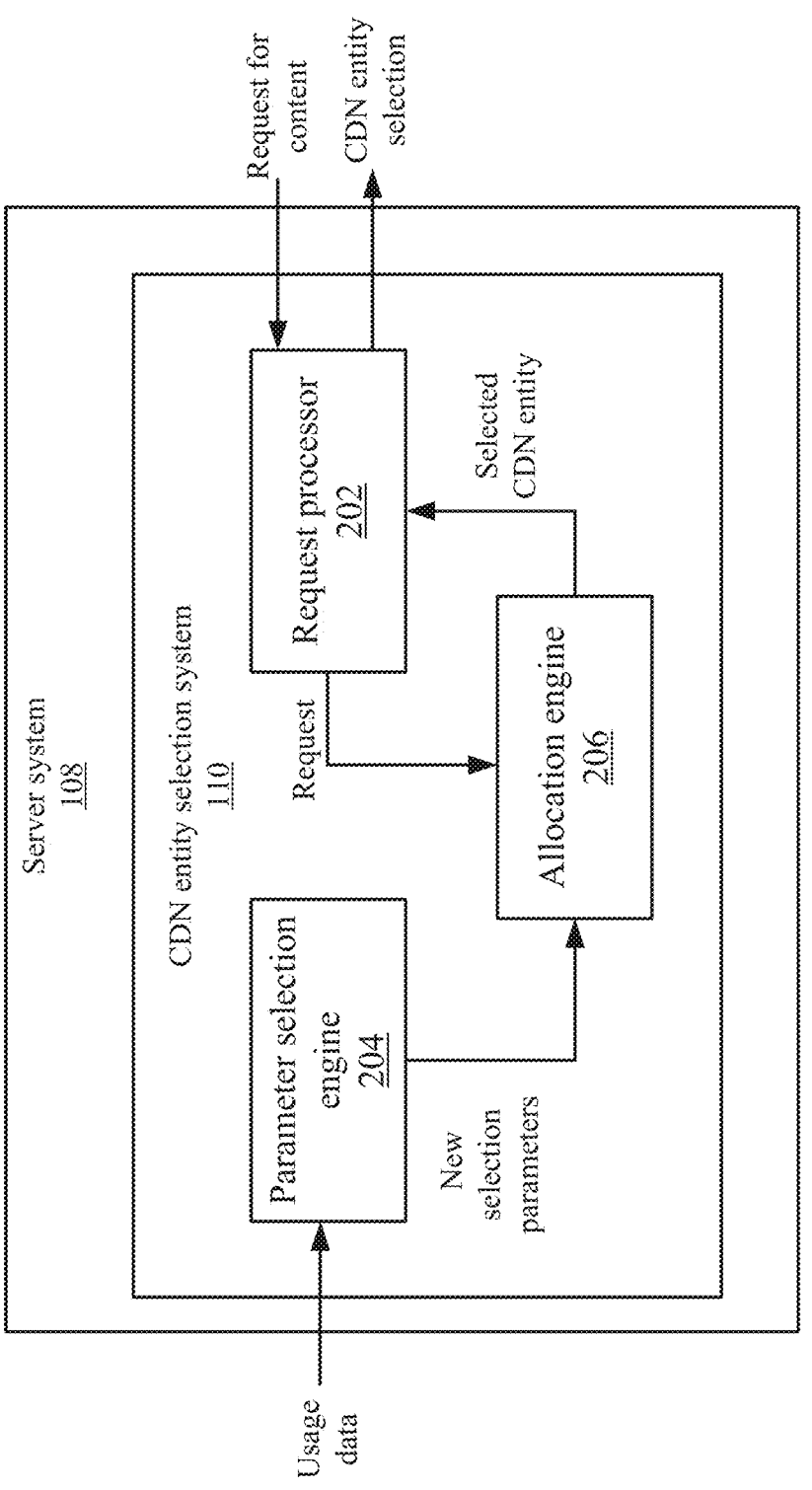
FIG. 2 depicts a more detailed example of a content delivery network entity selection system according to some embodiments.

FIG. 2 depicts a more detailed example of CDN entity selection system 110 according to some embodiments. A request processor 202 receives a request for content. The request may be received from a client device 102, and may request a video for playback. Although one request is discussed, request processor 202 may be processing multiple requests over a time interval.

An allocation engine 206 may select a content delivery network entity 106 to process the request. Allocation engine 206 uses selection parameters to select a content delivery network entity among content delivery network entities 106. As will be discussed in more detail, the selection parameters may be used to distribute different proportions of requests among content delivery network entities 106 over N requests in a future time interval. For example, CDN selection system 110 may use a weighted random distribution to select a content delivery network entity 106 for a request. In this case, the selection parameters may be associated with weights. In some embodiments, a higher weight may translate into a higher proportion and a lower weight may translate into a lower proportion over time. For example, over N requests, a content delivery network entity 106 may be roughly selected to a proportion associated with the respective weight for that content delivery network entity 106. That is, if the proportion associated with a content delivery network entity 206 is 20%, then allocation engine 206 may allocate approximately 20% of N requests during a time interval. Although weights are discussed, other methods may be used, such as the selection parameters may be used in a prediction network to select content delivery network entities 106 to service requests.

As discussed above, in a separate process from the determination of which content delivery network entity 106 should process a request, the selection parameters may be updated dynamically without manual intervention. For example, a parameter selection engine 204 may update the selection parameters dynamically over time intervals. For a time interval, parameter selection engine 204 may receive usage data, and use the usage data to adjust the values of the selection parameters. The usage data may be an amount of data traffic that each content delivery network entity 106 processed during a last time interval. The amount of data traffic may be measured in different metrics, such as the number of bytes that were processed to deliver videos to client devices 102 in the last time interval. Parameter selection engine 204 uses the data traffic to generate selection parameters, which will now be described in more detail.

Parameter Adjustment Method

FIG. 3 depicts a simplified flowchart 300 of a method for adjusting selection parameters according to some embodiments. This process is used to adjust the selection parameters and not to select a content delivery network entity 106 to service a request. The following example may use data traffic as the usage data that is used; however, other types of usage data may be used. For example the amount of bytes may be an amount of computer processing resources. At 302, parameter selection engine 204 receives an amount of data traffic that was delivered in a last time interval. The amount of data traffic that is used may be collected using different methods. For example, network devices in a network may collect the amount of data traffic that is sent for a provider, and send the amount of data traffic to parameter selection engine 204. Also, each content delivery network entity 106 may send the amount of data traffic that was delivered in the last time interval. Further, client devices 102 may send the amount of data traffic that each client device received and from which content delivery network entity 106. Any combination of the above may be used to collect the usage data. Parameter selection engine 204 may then determine the total amount of data traffic that was delivered based on the data traffic delivered by each content delivery network entity 106. For example, the total amount of data traffic may add the individual amounts of data traffic that was delivered by each content delivery network entity 106.

Parameter selection engine 204 then uses the observed data traffic from the last time interval to determine new values for selection parameters. In some embodiments, parameter selection engine 204 may adjust the selection parameters such that a distribution of data traffic that is delivered by content delivery network entities 106 in a future time interval may converge towards an ideal distribution. A distribution may be a proportional amount of total data traffic. For example, if the ideal proportion of data traffic is 10 Gbps for a content delivery network entity 106, parameter selection engine 204 may determine that content delivery network entity 106 will be allocated 15 Gbps in the next time interval if the parameters are not changed. Then, parameter selection engine 204 may adjust the selection parameters such that content delivery network entity 106 will deliver less data traffic in the next time interval. For example, the new selection parameters may cause content delivery network entity 106 to deliver less than 15 Gbps of data traffic, such as 12.5 Gbps of data traffic. Parameter selection engine 204 adjusts the selection parameters with a goal that data traffic delivered for content delivery network entities 106 in a next time interval may move towards an ideal proportion of data traffic in the distribution. For example, content delivery network entity 106 may eventually deliver around 10 Gbps of data traffic after a number of time intervals. The following will now describe an example of this process to perform the adjustment, but other processes may be used.

At 304, parameter selection engine 204 allocates data traffic in an ideal data traffic distribution to content delivery network entities 106 using a first allocation plan. The allocation here in 304 and 306 of FIG. 3 may be separate from the use of selection parameters to select a content delivery network entity 106 to service a request. The ideal distribution may be a desired distribution based on the data traffic sent in the last time interval. This is the distribution that parameter selection engine 204 may consider an optimal distribution. The distribution may assign different amounts of data traffic to content delivery network entities 106. In some embodiments, the first allocation plan may use a first method to allocate the data traffic to content delivery network entities 106. For example, the allocation plan may use ideal weights to allocate the data traffic. The ideal weights may be defined based on policies from content delivery network entities 106. For example, a policy may include the ideal weights, which may be a preferred proportion of data traffic that is agreed upon, such as the proportion of traffic a content delivery network entity 106 would like to process, how much traffic the content provider would like content delivery network entity 106 to process, or any combination of the above. In some embodiments, the ideal weights may be referred to as Quality of Experience (QoE) weights because these weights define proportions of traffic that content delivery network entities 106 may handle to ensure a high level of service. The QoE weights may be specified by the content provider, the content delivery entity, by both, or using other methods. The ideal weights may translate to a proportion of the data traffic for each content delivery network entity 106. For example, an ideal weight of 20% for a content delivery network entity 106 may result in around 2 Gbps of 10 Gbps of total data traffic being assigned in a next time interval, and an ideal weight of 40% for a content delivery network entity 106 may result in around 4 Gbps of 10 Gbps of total data traffic.

At 306, parameter selection engine 204 allocates the data traffic to content delivery network entities 106 based on a second allocation plan to generate an effective distribution. The effective distribution may be a predicted distribution that may result during the actual processing of requests if the current values of the selection parameters are used. The second allocation plan may use a different method than the first allocation plan. For example, the second allocation plan may include a condition (or conditions) that is used to assign the data traffic where the condition may not be used to generate the ideal distribution. The condition may alter how the data traffic is allocated in the second allocation plan. Accordingly, the effective distribution may be how much data traffic each content delivery network entity 106 may actually process in the next time interval using the data traffic from last time interval when applying the condition of the second allocation plan. One example of a condition may be a maximum data traffic limit, which specifies the maximum amount of data a content delivery network entity 106 can be allocated in a time interval. The first allocation plan may not use the maximum data traffic limit. The use of the maximum data traffic limit may change the data traffic that is allocated to a content delivery network 106 from 4 Gbps to 2 Gbps because the maximum data traffic limit is 2 Gbps. Other conditions may be used, such as minimum traffic limits, different ideal weights, etc. An example of the second allocation plan will be described in FIG. 4.

At 308, parameter selection engine 204 generates new values for selection parameters based on the effective distribution and the ideal distribution. For example, the new values for selection parameters may attempt to adjust the effective distribution to be closer to the ideal distribution in the next time interval. The effective distribution is the predicted data traffic distribution due to the current values of the selection parameters, whereas the ideal distribution is the desired distribution. The new values for the selection parameters are used in the next time interval. The process of generating the new selection parameters will be described in more detail below in FIG. 5.

At 310, parameter selection engine 204 may output the new values for the selection parameters. In the next time interval, CDN entity selection system 110 uses the new values to select content delivery network entities 106 for requests. It is expected that the adjustments in selection parameters may adjust the effective distribution in the next time interval to be closer to the ideal distribution. For example, a new measurement of data traffic for the next time interval is received and analyzed according to the process described in FIG. 3 again.

As discussed above, parameter selection engine 204 may assign the data traffic to content delivery network entities based on a first allocation plan to generate an ideal distribution and a second allocation plan to generate an effective distribution in different ways. The following will discuss examples of the first allocation plan and the second allocation plan, but other allocation plans may be appreciated.

Allocation Plan

Figure 4:
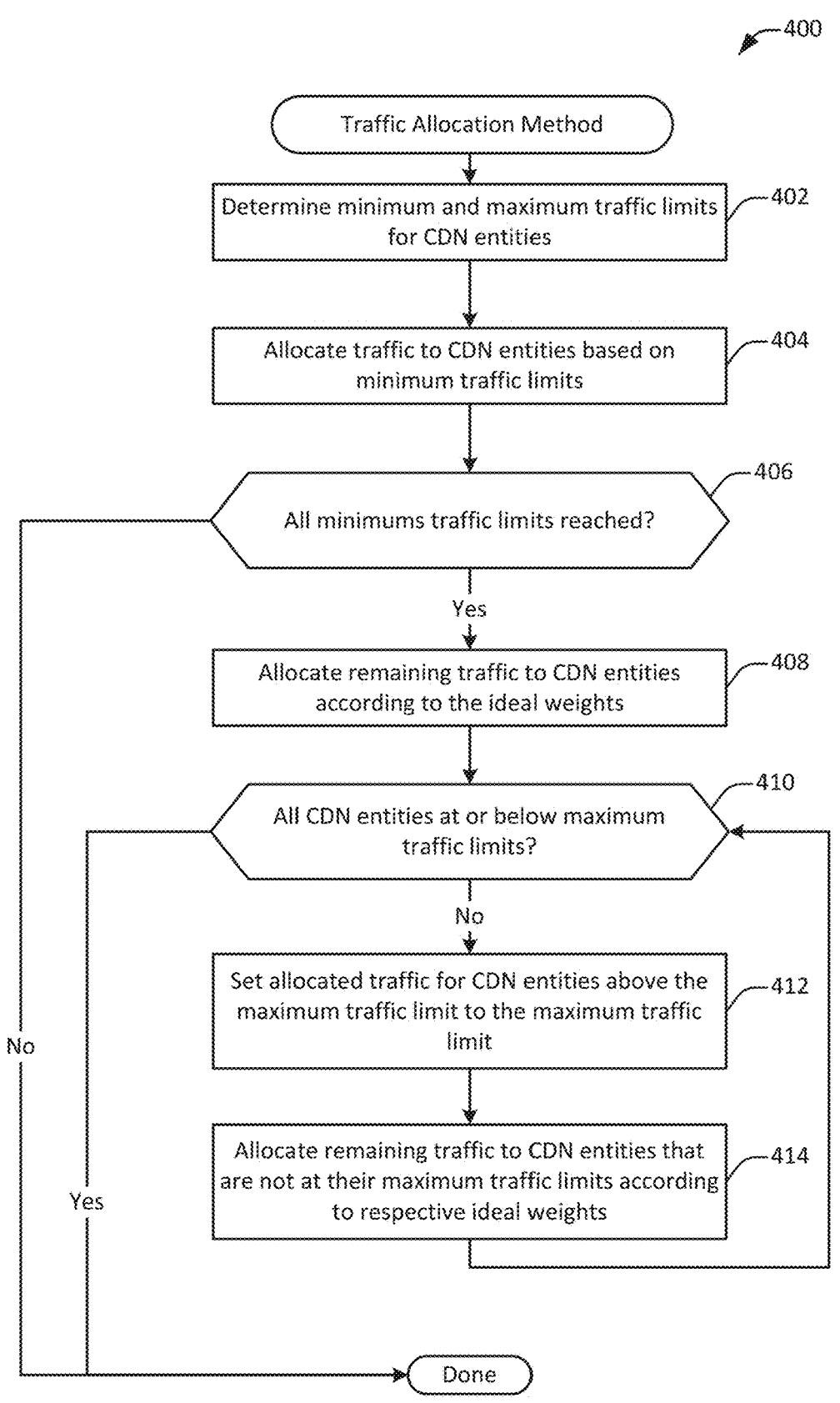
FIG. 4 depicts a simplified flowchart of a method for allocating data traffic according to some embodiments.

FIG. 4 depicts a simplified flowchart 400 of a method for allocating data traffic according to some embodiments. The process may be performed for each time interval or when traffic to allocate is received. At 402, parameter selection engine 204 determines a minimum data traffic limit and a maximum data traffic limit for content delivery network entities 106. The minimum data traffic limit may be the minimum amount of data traffic that should be allocated to a respective content delivery network entity 106 in the next time interval. The maximum data traffic limit may be the maximum amount of data traffic that may be allocated to a respective content delivery network entity 106 in the next time interval. Each respective content delivery network entity 106 may have its own minimum and maximum data traffic limits. The minimum data traffic limit and the maximum data traffic limit may be used in this process to determine the new values of the selection parameters, but the minimum data traffic limit and the maximum data traffic limit may not be explicitly used in the request processing. Accordingly, it is possible that in the actual distribution of requests to content delivery network entities 106, a content delivery network entity 106 may end up processing less data traffic than the minimum data traffic limit or more data traffic than the maximum data traffic limit in the next time interval.

At 404, parameter selection engine 204 allocates data traffic to content delivery network entities 106 based on the minimum data traffic limits. For example, if a minimum data traffic limit is 10 Gbps for a content delivery network entity 106, parameter selection engine 204 allocates 10 Gbps of data traffic to that content delivery network entity 106. In most cases, the minimum data traffic limits may all be met by the data traffic that was received in the last time interval. For example, the total amount for all the minimum data traffic limits may be 50 Gbps of data traffic. If the total data traffic to allocate is above 50 Gbps, then all the minimum data traffic limits will be met. Accordingly, at 406, parameter selection engine 204 determines if all minimum data traffic limits have been reached. If the minimum traffic limits have not been met, there is no more traffic to allocate and thus the process to allocate traffic for this time interval ends for this time interval. If the total amount of data traffic to allocate is less than the total amount of minimum data traffic limits, parameter selection engine 204 may allocate the data traffic based on a proportional allocation for content delivery network entities 106, such as using the ideal weights. The allocated data traffic that is below the minimum data traffic limits is then output.

If all the minimum data traffic limits are reached, the process proceeds to 408, where parameter selection engine 204 allocates the remaining data traffic to content delivery network entities 106 according to the ideal weights. For example, the ideal weights may be translated into proportions of the remaining data traffic for content delivery network entities 106. Parameter selection engine 204 uses the proportions to allocate a portion of the remaining data traffic to each content delivery network entity 106. For example, if there is 100 Gbps of data traffic left to allocate, a content delivery network entity 106 with a weight corresponding to 20% will be allocated 20 Gbps of data traffic.

This forms the ideal distribution for each content delivery network entity 106. The ideal distribution is the amount of data traffic that would have been ideally distributed to respective content delivery network entities 106. However, as will be described in more detail below, content delivery network entities 106 may have maximum data traffic limits (or other conditions) that may prevent the ideal distribution from being allocated. That is, the ideal distribution may allocate data traffic to a content delivery network entity 106 that is above its maximum data traffic limit.

At 410, parameter selection engine 204 determines whether all content delivery network entities 106 are at or below the maximum data traffic limits. If all content delivery network entities 106 are at or below the maximum data traffic limits, the process to allocate traffic ends for this time interval, and the data traffic has been allocated. However, if at least some content delivery network entities 106 are above the maximum data traffic limits, parameter selection engine 204 adjusts the distribution of data traffic. For example, parameter selection engine 204 may attempt to reallocate data traffic such that all content delivery network entities 106 are at or below the maximum data traffic limits.

At 412, parameter selection engine 204 sets the allocated data traffic for content delivery network entities 106 that are above the maximum data traffic limit to the respective maximum data traffic limit for the content delivery network entities 106. For example, if the maximum data traffic limit is 10 Gbps for a content delivery network entity 106, and that content delivery network entity 106 was allocated 12 Gbps, then parameter selection engine 204 reduces the amount of data traffic allocated to that content delivery network entity 106 to 10 GB of data traffic. This results in 2 Gbps of remaining data traffic to be reallocated to other content delivery network entities 106. Parameter selection engine 204 may perform this process for all content delivery network entities 106 that had data traffic allocated above their maximum data traffic limit. This creates an excess amount of remaining data traffic to allocate.

At 414, parameter selection engine 204 allocates the remaining data traffic to content delivery network entities 106 that are not at their maximum data traffic limits, according to the ideal weights. For example, parameter selection engine 204 may determine content delivery network entities 106 that have available space under their maximum data traffic limit. Then, parameter selection engine 204 determines proportions of the remaining data traffic to allocation to these content delivery network entities 106 based on their respective ideal weights. The data traffic is allocated accordingly to the proportions. For example, a content delivery network entity 106 that has a proportion of 40% of the remaining traffic of 10 Gbps is allocated 4 Gbps.

The process then reiterates to 410 where parameter selection engine 204 determines whether all content delivery network entities 106 are at or below the maximum data traffic limits. The above process then continues until all content delivery network entities 106 are at or below respective maximum data traffic limits. In the case where all maximum data traffic limits are met by all content delivery network entities 106, then parameter selection engine 204 may allocate the remaining data traffic to all content delivery network entities 106 according to their respective ideal weights. This may result in all or some content delivery network entities 106 being above their respective maximum data traffic limits, and the process continues. When the process ends, the amount of data traffic allocated to content delivery network entities 106 is output. Then, parameter selection engine 204 determines selection parameters from the allocated traffic.

Selection Parameter Calculation

Figure 5:
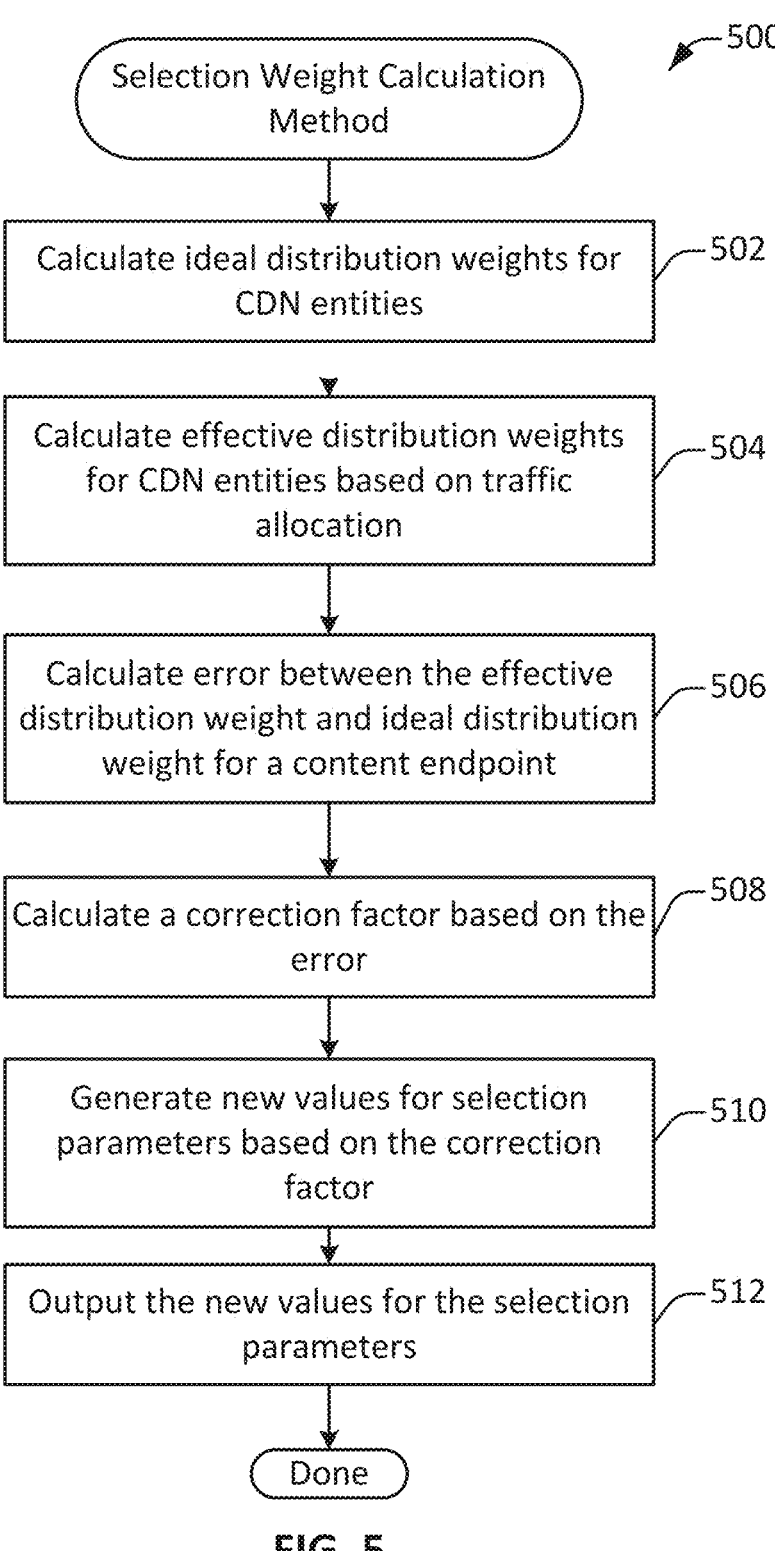
FIG. 5 depicts a simplified flowchart of a method for calculating selection parameters according to some embodiments.

FIG. 5 depicts a simplified flowchart 500 of a method for calculating selection parameters according to some embodiments. After allocating the data traffic to content delivery network entities 106, parameter selection engine 204 calculates new selection parameters. At 502, parameter selection engine 204 calculates ideal distribution weights for content delivery network entities 106. As described above, the ideal distribution may have been determined at 408 in FIG. 4 when the remaining data traffic was allocated to content delivery network entities 106 without considering the maximum data traffic limits. For each content delivery network entity 106, the ideal distribution weights may be determined based on the respective data traffic allocated and the total data traffic (e.g., respective data traffic allocated/the total data traffic=ideal distribution weight). For example, the ideal distribution weight may be 25% for a content delivery network entity 106 if 25 Gbps/100 Gbps was allocated to that content delivery network entity 106.

At 504, parameter selection engine 204 calculates effective distribution weights for content delivery network entities 106 based on the data traffic allocation. The effective distribution weights may be based on an effective distribution that was calculated in 414 in FIG. 4. For example, for a content delivery network entity 106, the effective distribution weight may be the respective proportion of the effective distribution of the data traffic allocated in FIG. 4. For each content delivery network entity 106, the effective distribution weights may be determined based on the respective data traffic allocated in 414 of FIG. 4 and the total data traffic (e.g., respective data traffic allocated/the total data traffic=effective distribution weight). The effective distribution weights may capture how the data traffic may have been delivered in the prior time interval based on the conditions of the second allocation plan. For example, the effective distribution weight may be 35% for a content delivery network entity 106 while the ideal distribution weight was 25%.

At 506, parameter selection engine 204 calculates the error between the effective distribution weight and the ideal distribution weight for each content delivery network entity 106. For example, the error is based on the respective ideal distribution weight and respective effective distribution weight for a content delivery network entity 106. In some embodiments, the difference, such as the value for the ideal distribution weight minus the value for the effective distribution weight is used as the error. For example, the error may be effective distribution weight—ideal distribution weight (e.g., 35%–25%=10%). Other errors may also be appreciated, such as an average over the last X time periods, a weighted error, etc.

After determining the error, at 508, parameter selection engine 204 may calculate a correction factor based on the error for each content delivery network entity 106. The correction factor is a value that indicates how to correct the selection parameter for a content delivery network entity 106. The correction factor may be determined using different methods or not used at all. In some embodiments, the correction factor may use a control process that may adjust the error using a control function. The control function may ensure that corrections to selection parameters may be adjusted in a desired configuration, such as not abruptly, avoiding oscillations, and not be over or under an amount of a correction, etc. In some embodiments, a proportional integral derivative control loop may be used, which is a control loop mechanism that employs feedback from prior adjustments to adjust values. For example, the correction factor may adjust the error in a smaller amount than that is determined if the error may abruptly change the selection parameter too much in a time interval. In some examples, the error may be 10%, but the correction factor may adjust the error to be 6%. The correction factor could be the value of 6% in this case. As discussed above, the error may not be corrected, which results in the error of 10% that was calculated in 506 being used as the correction factor.

At 510, parameter selection engine 204 generates new values for selection parameters based on the correction factor. For example, parameter selection engine 204 corrects the effective distribution weight based on the correction factor to generate the new values for the selection parameters. For example, parameter selection engine 204 adjusts the effective distribution weight to be higher or lower. If the effective distribution weight is 35%, and the correction factor is 5%, the correction of the effective distribution weight may be 30%. Instead of adjusting the effective distribution weight directly to 25%, which is the ideal distribution weight, the effective distribution weight may be adjusted in smaller increments over multiple time intervals to be closer and closer to the ideal distribution weight.

Parameter selection engine 204 may generate the new values for the selection parameters in different ways. For example, parameter selection engine 204 may use the effective distribution weight as the selection parameter directly. Parameter selection engine 204 may also generate the selection parameters based on other factors, such as translating the corrected effective distribution weight based on other factors, such as provider specific delivery goals.

At 512, parameter selection engine 204 outputs the new values for the selection parameters. The new values for the selection parameters may be used to assign content delivery network entities 106 to requests in the next time interval. For example, referring to FIG. 2, allocation engine 206 receives the new selection parameters from parameter selection engine 204. Then, allocation engine 206 receives a request in current time interval. Allocation engine 206 may select a content delivery network entity 106 using the new selection parameters. The selection parameters may be used to select content delivery network entity 106, and not the traffic that was allocated in the process to determine the new selection parameters.

The above process described in FIGS. 4 and 5 may be repeated every time interval. For example the time interval may be set as a minute in a configuration setting, and the process is repeated every minute using updated information from the last minute. Over time, the effective distribution weights that are calculated may approach the ideal distribution weights. By having the effective distribution weights, which are used to generate the new values for the selection parameters, approach the ideal distribution weights, the system is slowly moving the allocation of data traffic to content delivery network entities 106 to the desired ideal distribution. For example, over multiple time intervals, the data traffic processed by a content delivery network entity 106 may move from 20 Gbps to 18 Gbps to 15 Gbps when the ideal distribution is 14 Gbps.

The above process improves the adjustment of selection parameters. For example, the parameters may be adjusted towards an ideal distribution, which may improve the selection of content delivery network entities 106. Improving the selection of content delivery network entities 106 may also improve the delivery of content to client devices 102. For example, the bandwidth may be used more optimally and can respond to changes in network conditions faster compared to other processes, such as a manual or static configuration of selection parameters. Further, the process of selecting the new values for selection parameters may be improved by having the effective distribution weights be automatically adjusted to be eventually closer to the ideal distribution weights. This moves the system closer to the ideal distribution faster.

Example

Figures 6A, 6B:
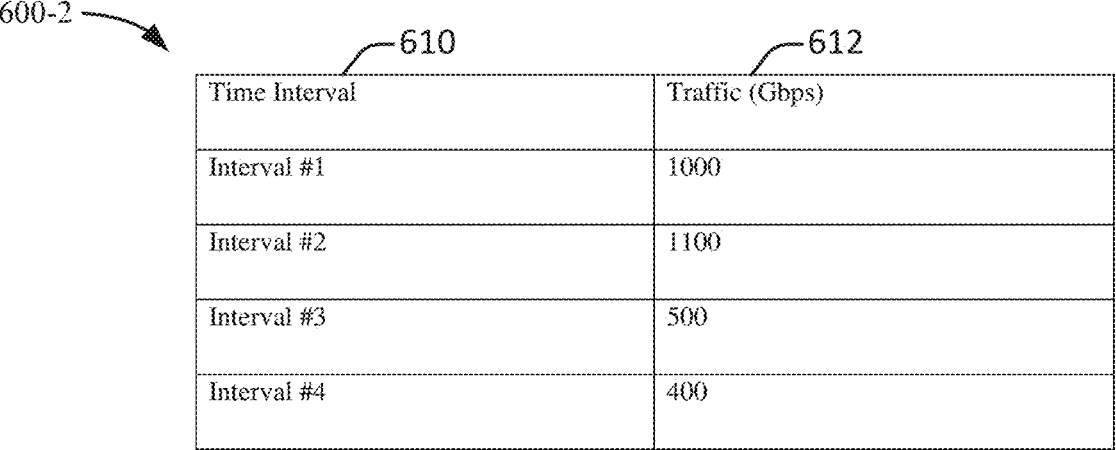

FIGS. 6A to 6C depict different tables showing the analysis of data traffic to allocate the data traffic to CDN entities 106 according to some embodiments. FIG. 6A depicts an example of using weights according to some embodiments. A table 600-1 lists CDN entities 106 in a column 602, minimum data traffic limits (Gbps) in a column 604, maximum data traffic limits (Gbps) in a column 606, ideal weights in a column 608, and normalized ideal weights in column 609. The normalized ideal weights may be a normalized version of the ideal weights to values between a range, such as a range of [0,1].

In table 600-1, in each row, the respective minimum data traffic limit, maximum data traffic limit, and ideal weight is shown for respective CDN entities 106, such as entities #1, #2, #3, #4, and #5. For example, CDN entity #1 has a minimum data traffic limit of "2 Gbps", a maximum data traffic limit of "1000 Gbps" an initial weight of "3", and a normalized initial weight of "0.2".

FIG. 6B depicts a table 600-2 showing the data traffic received for a prior time period according to some embodiments. Table 600-2 shows the time interval in a column 610 and the data traffic from a previous time interval in a column 612. For example, in time interval #1, "900 Gbps" was processed by CDN entities 106.

FIGS. 6C to 6F depict iterations that may be performed applying the process of FIG. 4 to allocate data traffic to CDN entities 106 according to some embodiments. A tables 600-3 to 600-7 list the CDN entities 106 in a column 614, an effective distribution of traffic (Gbps) in a column 616, an ideal distribution of traffic (Gbps) in a column 618, a correction in a column 620, an allocation in a column 622, and selection parameters in a column 624.

The effective distribution in column 616 is the data traffic that would be assigned using a condition, such as the maximum traffic limits. The ideal distribution in column 618 is the data traffic that is ideally assigned without using a condition, such as the maximum traffic limits. The correction factor in column 620 is an amount of correction to apply to the effective distribution based on the difference between the effective distribution and the ideal distribution. Different correction factors may be used, such as proportional, derivative, and integral. The allocation of the traffic is based on the correction and the effective distribution. The weights may be based on the allocation of traffic. For example, a higher allocation of traffic may mean a higher weight is applied to a respective entity.

In each time interval, the allocation of the traffic may change based on the effective distribution and the correction. The allocation then is used to change the selection parameters for the next time interval. Accordingly, the traffic allocated to an entity may be closer to the ideal distribution in the next time interval. Instead of using the effective distribution, the allocation is used. The allocation may be corrected from the effective distribution, but may not be equal to the ideal distribution. For example, in table 600-3, entity #1 has an effective distribution of 144.89, an ideal distribution of 150.4, and a correction of 4.41. The allocation is 149.3, which corrects the effective distribution to be closer to the ideal distribution. The above process continues for each time interval, and the selection parameters are adjusted each time interval based on the traffic that was delivered in the last time interval. For example, entity #1 has its selection parameter changed from 0.15 to 0.15 to 0.11 and to 0.10 in the four time intervals. The other entity's selection parameters also change based on traffic that was delivered in the previous time interval. Correcting the selection parameters may cause entities to deliver traffic in the next time interval that may be closer to the ideal distribution than the effective distribution.

Conclusion

Accordingly, selection parameters are generated dynamically over time intervals based on the usage of content delivery entities. The selection parameters may be changed to optimize the distribution of data traffic to content delivery entities. Over time, the selection parameters may be adjusted such that the distribution of data traffic that is allocated to content delivery network entities 106 becomes closer to the desired ideal distribution.

System

Figure 7:
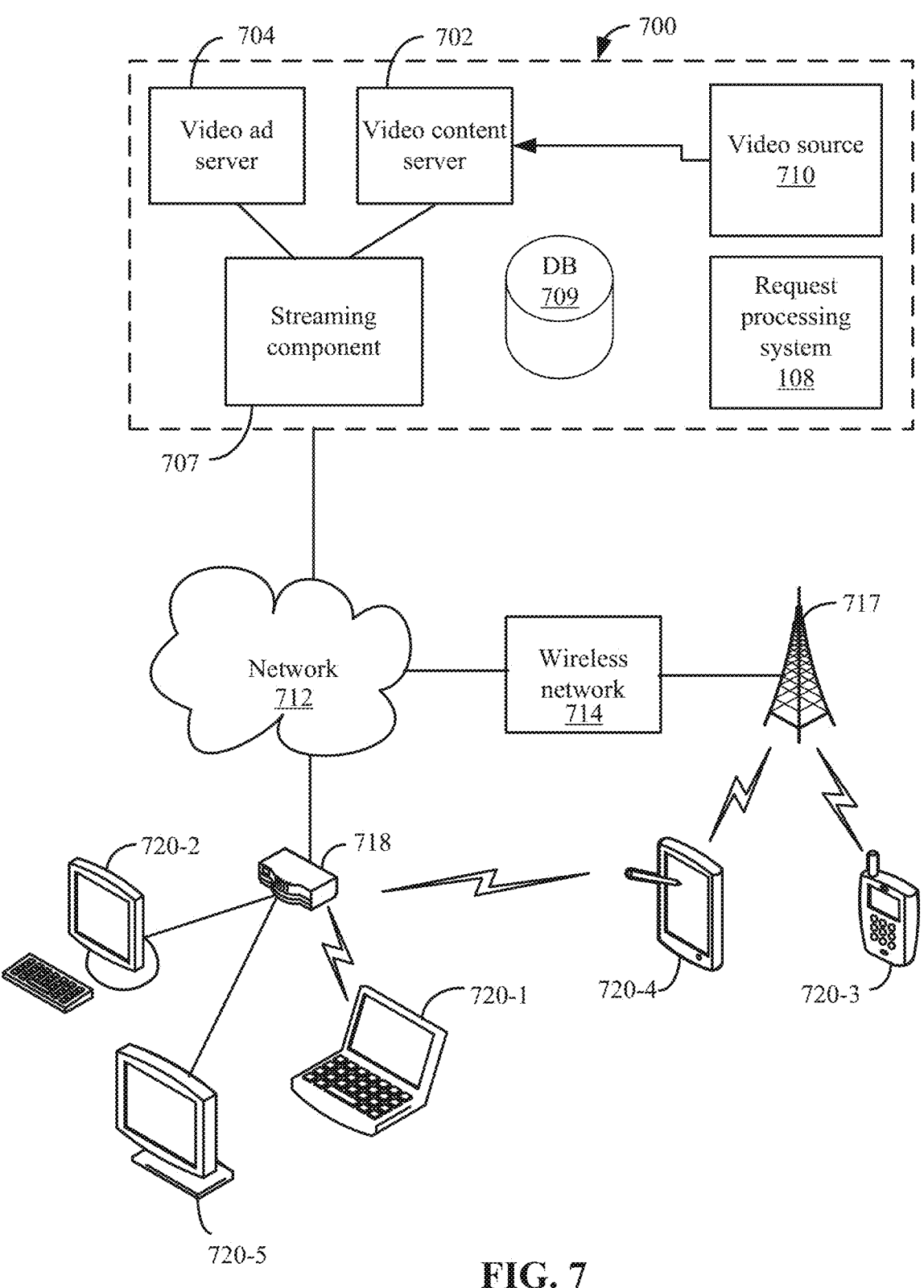
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include request processing system 108.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery network entities (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
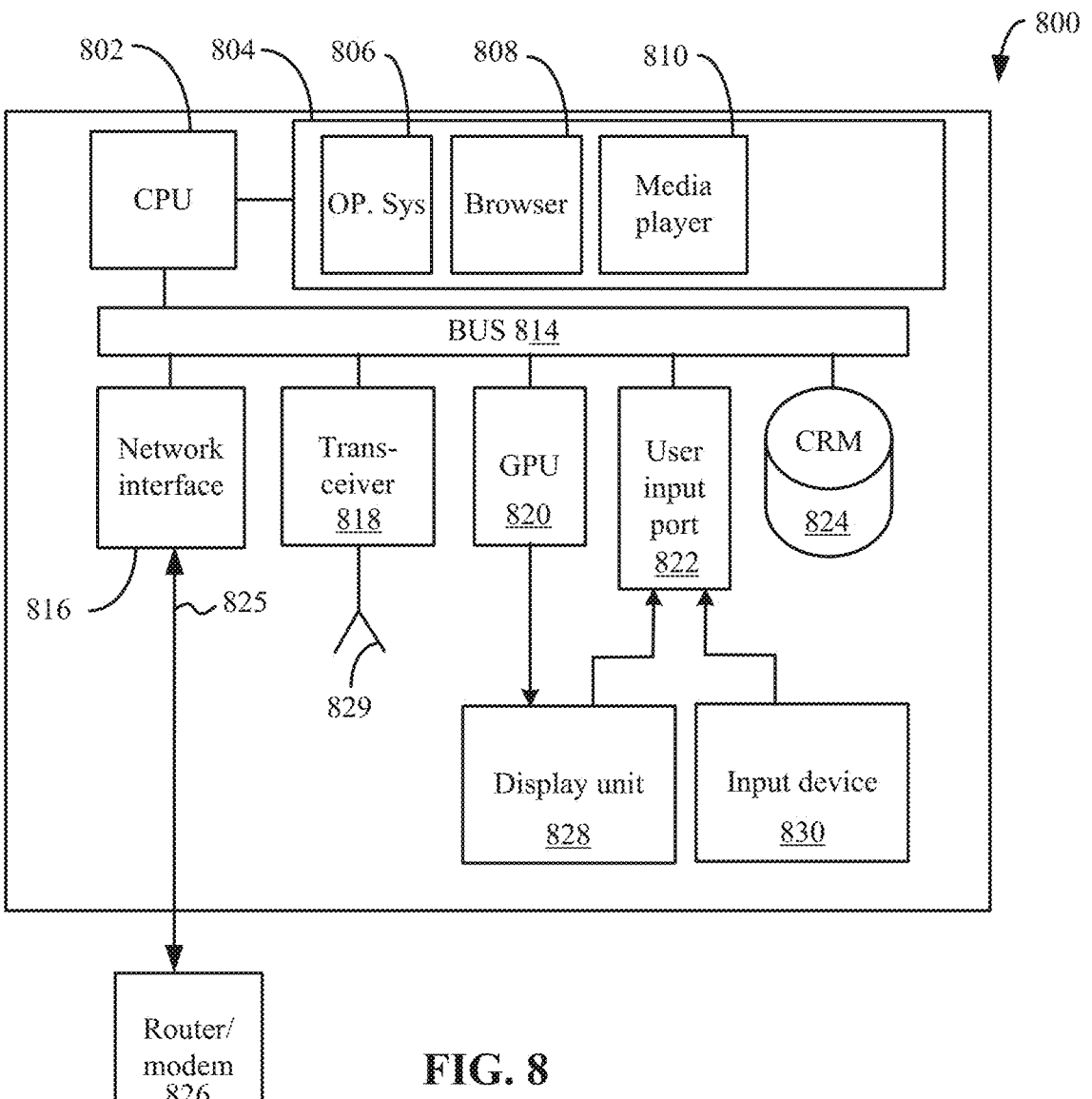
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method executed by a computing device comprising:
    delivering content using a plurality of content delivery network (CDN) entities that are servicing first requests according to a selection parameter in a last time interval;
    receiving usage data that was delivered in the last time interval, wherein:
        the usage data is based on delivering the content from servicing the first requests, an ideal distribution is based on an ideal allocation of usage data from delivering the content by the plurality of CDN entities in a next time interval,
    the ideal distribution is not based on the selection parameter, and does not use a network condition associated with the plurality of CDN entities,
    an effective distribution is based on an effective allocation of the usage data from delivering the content to the plurality of CDN entities in the last time interval
    the effective distribution uses the network condition,
    the selection parameter is based on a correction of the effective distribution using a correction factor in the next time interval, and
    the correction factor is based on a difference between the ideal distribution and the effective distribution, and the correction factor is used to correct the effective distribution to be closer to the ideal distribution,
    outputting the selection parameter; and
    delivering, based on the selection parameter, content for a second request to a particular CDN entity of the plurality of CDN entities according to a distribution that is closer than the effective distribution to the ideal distribution in the next time interval.

2. The method of claim 1, wherein the selection parameter is a weighted selection parameter based on the correction factor.

3. The method of claim 1, wherein the network condition is a maximum data traffic limit or a minimum data traffic limit.

4. The method of claim 1, wherein the ideal allocation of usage data is based on an ideal weight associated with a CDN entity of the plurality of CDN entities.

5. The method of claim 1, wherein the effective allocation of usage data is based on an ideal weight and a limit on an amount of the usage data associated with a CDN entity of the plurality of CDN entities.

6. The method of claim 5, wherein a first amount of the usage data of the effective allocation is based on a minimum limit on the amount of usage data associated with the CDN entity, and
    a second amount of the usage data of the effective allocation is based on the ideal weight associated with the CDN entity.

7. The method of claim 6, further comprising:
    removing an amount of usage data assigned to a first CDN entity based on a maximum limit on the amount of usage data for the first CDN entity.

8. The method of claim 7, wherein the removed amount of usage data is reallocated to a second CDN entity based on a maximum limit on the amount of usage data for the second CDN entity.

9. The method of claim 1, wherein the selection parameter dynamically and automatically changes over time as the network condition changes.

10. The method of claim 9, wherein the selection parameter is a normalized selection parameter associated with a number of requests received by the CDN.

11. The method of claim 10, wherein the difference between the ideal distribution and the effective distribution is a weighted error or an average error over a last plurality of time periods.

12. The method of claim 11, wherein the correction factor is based on a control function.

13. The method of claim 1, further comprising:
    receiving the second request from a client device.

14. The method of claim 1, wherein:

a first value for the selection parameter is constant for a first time interval, a different second value for the selection parameter is constant for a second time interval, and the first time interval is a previous time interval to the second time interval.

15. The method of claim 1, wherein the usage data comprises data traffic associated with the plurality of CDN entities.

16. A non-transitory computer-readable storage medium containing instructions, that when executed, control a computer system to be operable for:

delivering content using a plurality of content delivery network (CDN) entities that are servicing first requests according to a selection parameter in a last time interval;

receiving usage data that was delivered in the last time interval, wherein:

the usage data is based on delivering the content from servicing the first requests, an ideal distribution is based on an ideal allocation of usage data from delivering the content by the plurality of CDN entities in a next time interval, the ideal distribution is not based on the selection parameter, and does not use a network condition associated with the plurality of CDN entities, an effective distribution is based on an effective allocation of the usage data from delivering the content to the plurality of CDN entities in the last time interval, the effective distribution uses the network condition, the selection parameter is based on a correction of the effective distribution using a correction factor in the next time interval, and the correction factor is based on a difference between the ideal distribution and the effective distribution, and the correction factor is used to correct the effective distribution to be closer to the ideal distribution, outputting the selection parameter; and delivering, based on the selection parameter, content for a second request to a particular CDN entity of the plurality of CDN entities according to a distribution that is closer than the effective distribution to the ideal distribution in the next time interval.

17. The non-transitory computer-readable storage medium of claim 16, wherein the selection parameter is a weighted selection parameter based on the correction factor.

18. The non-transitory computer-readable storage medium of claim 16, wherein the ideal allocation of usage data is based on an ideal weight associated with a CDN entity of the plurality of CDN entities.

19. The non-transitory computer-readable storage medium of claim 16, wherein the effective allocation of usage data is based on an ideal weight and a limit on an amount of the usage data associated with a CDN entity of the plurality of CDN entities.

20. An apparatus comprising:

one or more computer processors; and a non-transitory computer-readable storage medium comprising instructions, that when executed, control the one or more computer processors to be operable for:

delivering content using a plurality of content delivery network (CDN) entities that are servicing first requests according to a selection parameter in a last time interval;

receiving usage data that was delivered in the last time interval, wherein:

the usage data is based on delivering the content from servicing the first requests, an ideal distribution is based on an ideal allocation of usage data from delivering the content by the plurality of CDN entities in a next time interval, the ideal distribution is not based on the selection parameter, and does not use a network condition associated with the plurality of CDN entities, an effective distribution is based on an effective allocation of the usage data from delivering the content to the plurality of CDN entities in the last time interval, the effective distribution uses the network condition, the selection parameter is based on a correction of the effective distribution using a correction factor in the next time interval, and the correction factor is based on a difference between the ideal distribution and the effective distribution, and the correction factor is used to correct the effective distribution to be closer to the ideal distribution, outputting the selection parameter; and delivering, based on the selection parameter, content for a second request to a particular CDN entity of the plurality of CDN entities according to a distribution that is closer than the effective distribution to the ideal distribution in the next time interval.

\* \* \* \* \*